(12) United States Patent  (10) Patent No.: US 7,114,810 B2
Bakkom et al.  (45) Date of Patent: Oct. 3, 2006

(54) MULTIMEDIA DISPLAY DEVICE

(75) Inventors: Jeffrey Scott Bakkom, Corvallis, OR (US); Dennis R. Esterberg, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 168 days.

(21) Appl. No.: 10/876,967

(22) Filed: Jun. 25, 2004

(65) Prior Publication Data

US 2005/0286027 A1  Dec. 29, 2005

(51) Int. Cl.
G03B 21/14 (2006.01)

(52) U.S. Cl. ........................................ 353/15
(58) Field of Classification Search ................ 353/15, 353/72, 119, 122
See application file for complete search history.

(56) References Cited

U.S. PATENT DOCUMENTS

| | | | |
|---|---|---|---|
| 3,880,507 A * | 4/1975 | Adams, Jr. ................... | 353/17 |
| 4,343,539 A | 8/1982 | Task | |
| 4,774,589 A | 9/1988 | Rowland | |
| 4,780,739 A | 10/1988 | Kawakami et al. | |
| 4,788,596 A | 11/1988 | Kawakami et al. | |
| 4,970,540 A | 11/1990 | Vasey et al. | |
| 4,978,205 A | 12/1990 | Sato | |
| 5,053,875 A | 10/1991 | Ishii et al. | |
| 5,153,633 A | 10/1992 | Otani | |
| 5,172,276 A | 12/1992 | Ueyama et al. | |
| 5,231,445 A | 7/1993 | Onuki et al. | |
| 5,243,462 A | 9/1993 | Kobayashi et al. | |
| 5,253,071 A | 10/1993 | MacKay | |
| 5,335,032 A | 8/1994 | Onuki et al. | |
| 5,377,089 A | 12/1994 | Miller | |
| 5,465,127 A | 11/1995 | Baldwin et al. | |
| 5,550,604 A | 8/1996 | Gale et al. | |
| 5,617,166 A | 4/1997 | Amanuma et al. | |
| 5,630,659 A | 5/1997 | Ronzani et al. | |
| 5,676,442 A | 10/1997 | Fujimori | |
| 5,734,932 A | 3/1998 | Washisu | |
| 5,743,610 A | 4/1998 | Yajima et al. | |
| 5,786,936 A | 7/1998 | Baumann et al. | |
| 5,818,950 A | 10/1998 | Sakamoto et al. | |
| 5,867,213 A | 2/1999 | Ouchi | |
| 5,873,004 A | 2/1999 | Shiomi | |
| 5,909,944 A | 6/1999 | Yajima et al. | |
| 5,940,630 A | 8/1999 | Washisu | |
| 6,007,205 A | 12/1999 | Fujimori | |
| 6,078,751 A | 6/2000 | Yamazaki et al. | |
| 6,095,653 A | 8/2000 | Yajima | |
| 6,169,574 B1 | 1/2001 | Noguchi et al. | |
| 6,208,377 B1 | 3/2001 | Morofuji et al. | |
| 6,437,675 B1 | 8/2002 | Chu | |

(Continued)

FOREIGN PATENT DOCUMENTS

EP  0 815 493  7/2000

(Continued)

OTHER PUBLICATIONS

"New Digital Projector Joins BenQ Lineup," < http://www.uemedia.net/LiveFromInfoComm/article_4597.shtml> , p. 1, Jun. 5, 2003.

(Continued)

*Primary Examiner*—William C. Dowling (57) ABSTRACT

A multimedia display device includes a housing, an image projector supported within the housing, a media player supported within the housing, a speaker supported within the housing, and a vibration isolation assembly provided between the speaker and the housing.

21 Claims, 7 Drawing Sheets

U.S. PATENT DOCUMENTS

| | | | |
|---|---|---|---|
| 6,623,128 B1* | 9/2003 | Kan | 353/74 |
| 6,966,651 B1 | 11/2005 | Johnson | |
| 2003/0002016 A1 | 1/2003 | Sellen et al. | |
| 2003/0038927 A1 | 2/2003 | Alden | |
| 2003/0038928 A1 | 2/2003 | Alden | |
| 2003/0112416 A1 | 6/2003 | Kan | |
| 2003/0202162 A1 | 10/2003 | Arai et al. | |
| 2003/0231497 A1 | 12/2003 | Sakata et al. | |
| 2004/0012982 A1 | 1/2004 | Kim | |
| 2004/0017548 A1 | 1/2004 | Denmeade | |
| 2005/0088620 A1* | 4/2005 | Dwyer et al. | 353/15 |
| 2005/0088621 A1* | 4/2005 | Ikeuchi | 353/15 |

FOREIGN PATENT DOCUMENTS

| | | |
|---|---|---|
| EP | 0 989 450 | 2/2003 |

OTHER PUBLICATIONS

Smallcombe, Steve, "BenQ PEB700 Single-Chip 16:9 DLP Digital Projector," < http://www.hometheaterhifi.com/volume_10_3/benq-8700-projector-8-2003.html> , pp. 1-15, Aug. 2003.

"Why is the Texas Instruments Digital Micromirror Device TM (DMD TM) So Reliable?," < http://www.dlp.com/dlp_technology/images/dynamic/white_papers/135_Myth.pdf> , pp. 1-7.

* cited by examiner

MULTIMEDIA DISPLAY DEVICE

BACKGROUND

Integrating audio with computer-displayed slide shows and videos adds an extra dimension to business, recreational, or other consumer presentations and, accordingly, also adds interest to the respective audiences. The slide shows and videos are commonly displayed using image projectors, such as digital image projectors. Digital image projectors have become increasingly portable in size making them well suited for travel allowing a business or consumer presenter to easily transport the digital image projector and associated laptop computer for use at remote sites.

However, incorporating audio into computer-displayed slide shows and videos can be problematic. The audio speakers typically included in laptop computers are not powerful enough to provide sufficient sound to be heard by an entire audience. Adding additional speakers adds cumbersome pieces to the presentation equipment, which decreases the overall portability of the presentation system. Speakers incorporated into the digital image projector can cause undesired vibration of the digital image projector, thereby, resulting in an unstable image projected onto a screen or other viewing surface. More specifically, during certain audio play, a speaker can move several millimeters. If the attached digital image projector moves even a fraction of this distance, the vibration translates into a relatively large movement of the projected image. Such movement of the projected image is distracting to the audience and detracts from the overall message of the presenter.

SUMMARY

One aspect of the present invention relates to a multimedia display device. The multimedia display device includes a housing, an image projector supported within the housing, a media player supported within the housing, a speaker supported within the housing, and a vibration isolation assembly provided between the speaker and the housing.

DETAILED DESCRIPTION

In the following detailed description, reference is made to the accompanying drawings which form a part hereof, and in which is shown by way of illustration specific embodiments in which the invention may be practiced. In this regard, directional terminology, such as "upper," "lower," "upward," "downward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
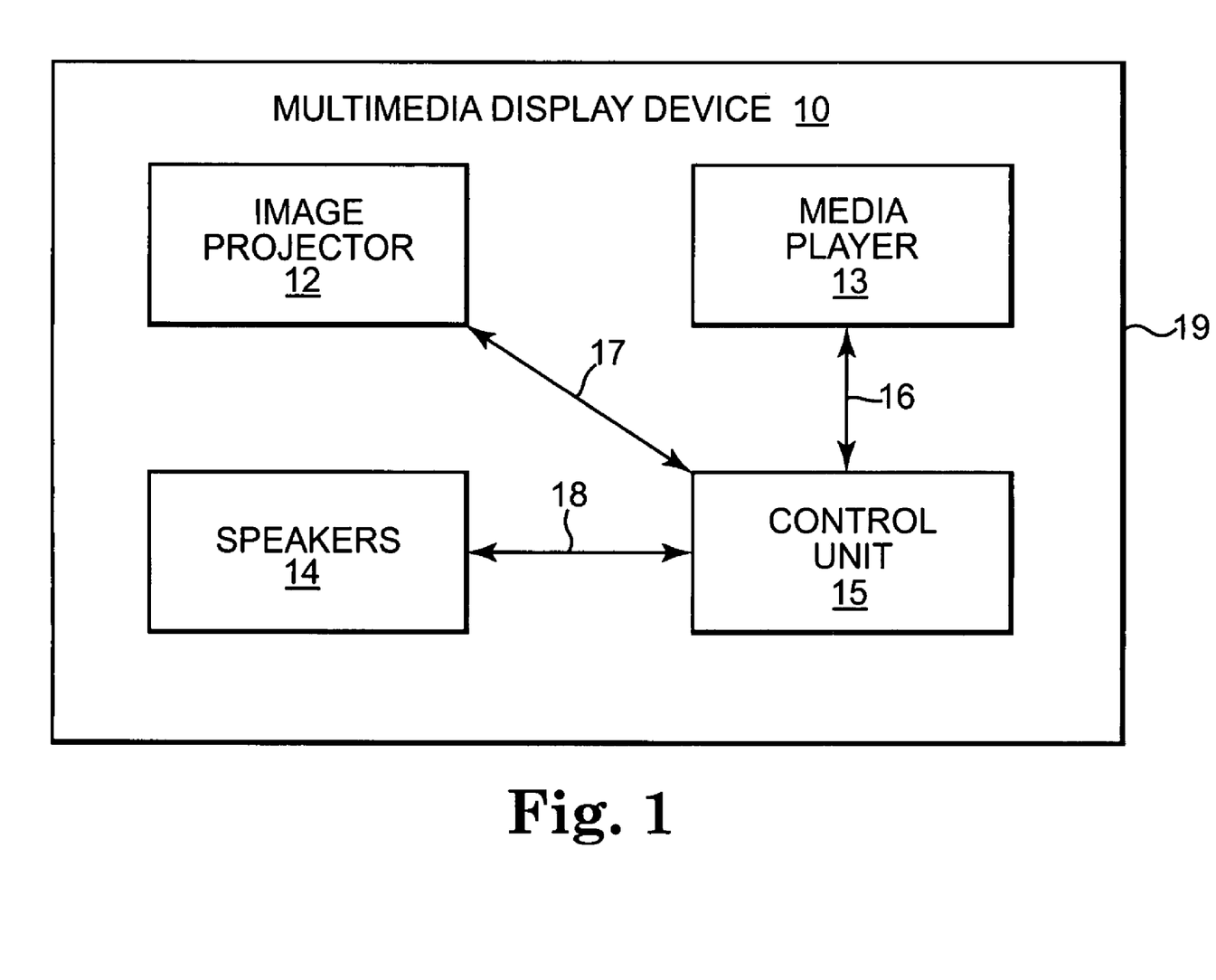
FIG. 1 is a block diagram of one embodiment of a multimedia display device.

FIG. 1 illustrates one embodiment of a multimedia display device 10. Multimedia display device 10 includes an image projector 12, a media player 13, one or more speakers 14, and a control unit 15. Image projector 12 receives a video signal and projects corresponding images to a viewing surface using various optical elements. Image projector 12 is any type of image projection device, such as, a liquid crystal display (LCD) projector, a digital light processing (DLP) projector, a liquid crystal or silicon (LCOS) projector, a slide projector, a film projector, etc.

Media player 13 provides audio and/or video content to image projector 12. In one embodiment, media player 13 provides the audio or video from a disc, such as a digital video disc (DVD), a compact disc (CD) (e.g., CD-ROM, CD-R, CD-RW, and CD+RW), or other disc configured to store audio and/or video content. Speakers 14 generate audible sounds in response to audio inputs, such as audio inputs from media player 13.

Control unit 15 includes a processor and memory and is coupled to each of image projector 12, media player 13, and speakers 14 via electrical and/or communication links 16, 17, and 18, respectively. In one embodiment, control unit 15 provides signals to image projector 12, media player 13, and speakers 14 to control the power supply to each, provide instructions to each, and coordinate the respective functioning of each of image projector 12, media player 13, and speakers 14.

In one embodiment, one or more components of multimedia display device 10 are housed within a housing 19. For example, housing 19 may contain image projector 12, media player 13, control unit 15, and one or more speakers 14. In one embodiment, as described below, housing 19 includes a first portion housing image projector 12, media player 13, and control unit 15, and a second portion housing one or more speakers 14.

Figure 2:
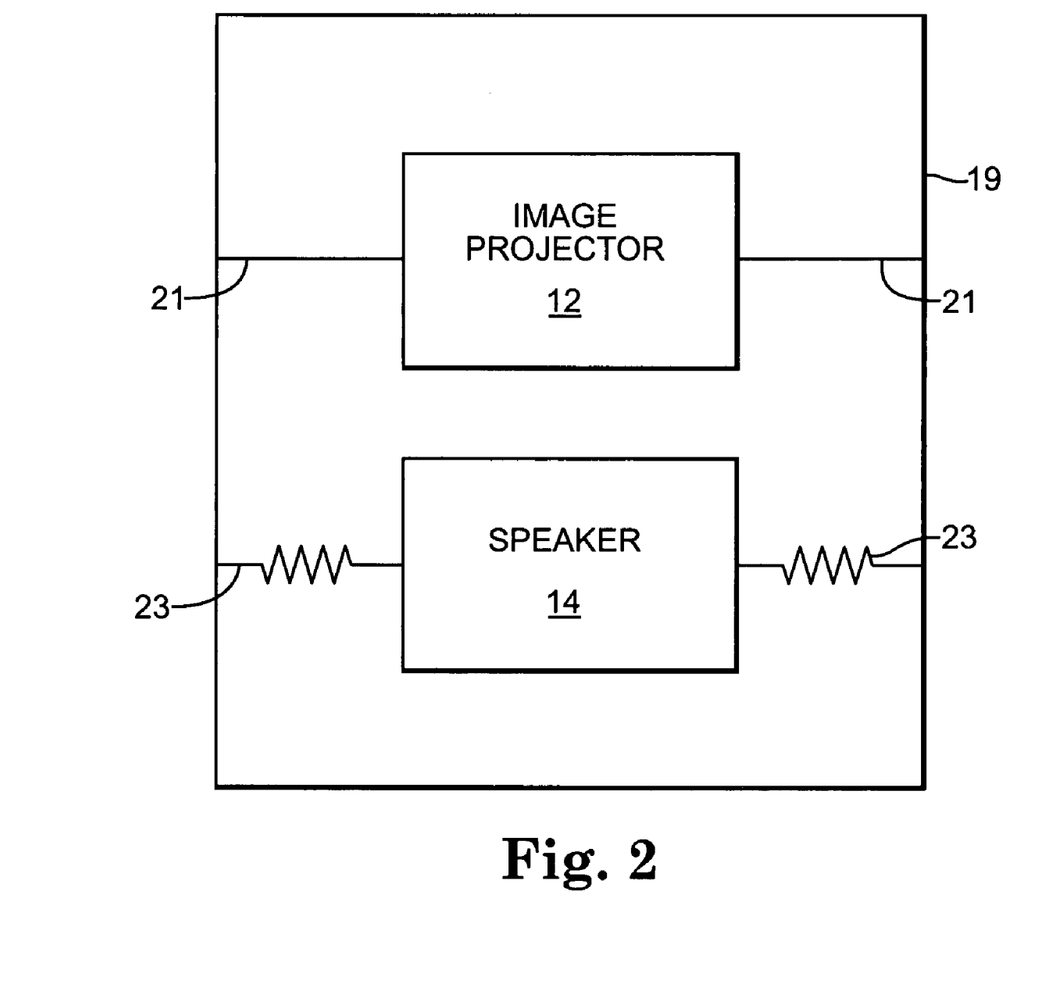
FIG. 2 is a block diagram of one embodiment of a multimedia display device.

FIG. 2 schematically illustrates one embodiment of multimedia display device 10 including image projector 12 and speaker 14 housed within housing 19. In one embodiment, image projector 12 is supported within housing 19 by a support assembly 21 and speaker 14 is supported within housing 19 by a vibration isolation assembly 23. Vibration isolation assembly 23 dampens vibrations produced by speaker 14 and prevents the vibrations from being transferred to housing 19 and, therefore, image projector 12, as described below.

Figure 3:
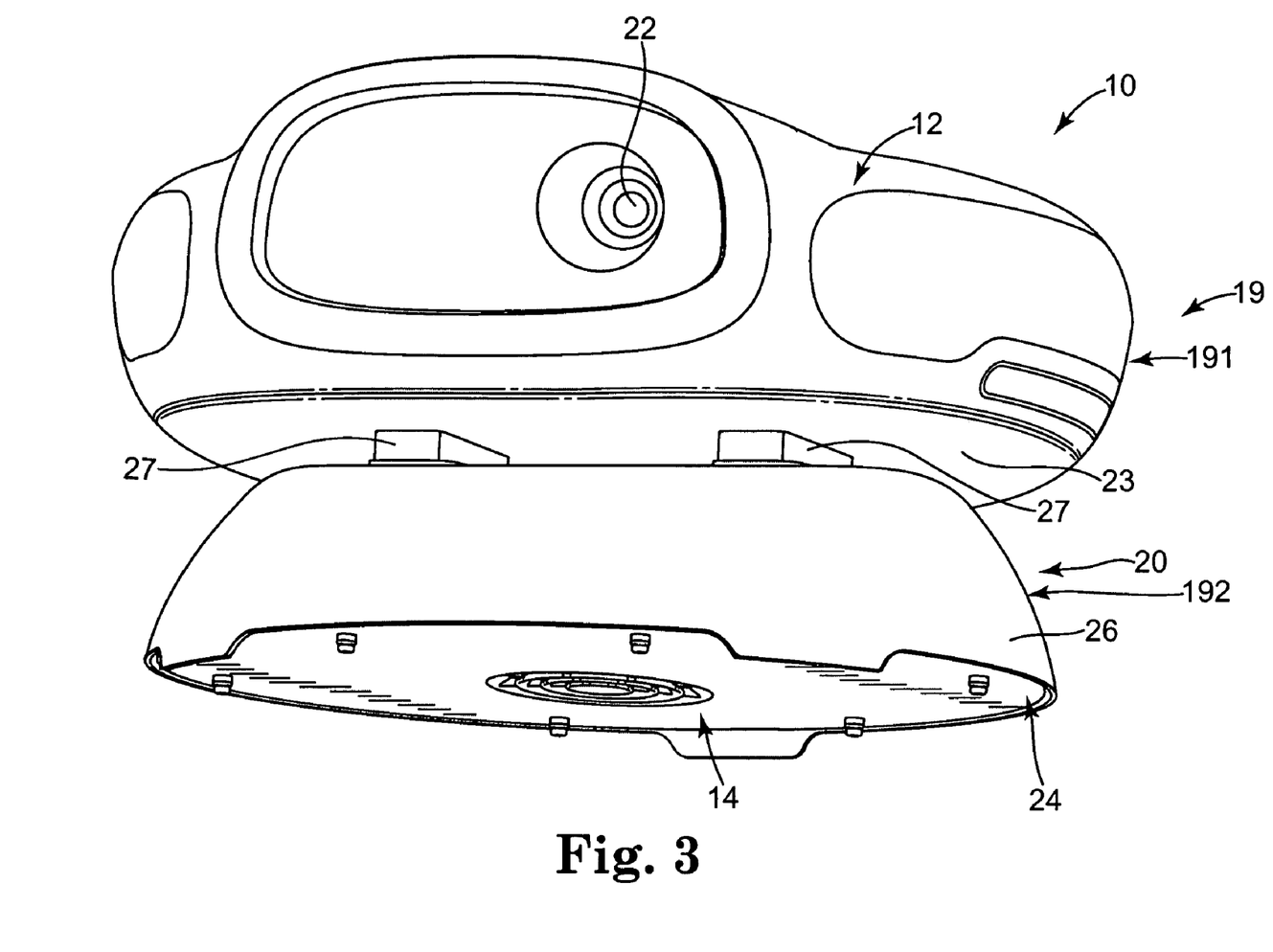
FIG. 3 is a bottom perspective view illustrating one embodiment of a multimedia display device.

FIG. 3 illustrates one embodiment of multimedia display device 10 including image projector 12 and a support assembly 20 which forms a portion of housing 19. In one embodiment, image projector 12 is supported by and mounted to support assembly 20. In one embodiment, housing 19 includes a first portion 191 and a second portion 192 such that image projector 12 is housed within first portion 191 of housing 19 and speaker 14 is housed within second portion 192 of housing 19. As such, speaker 14 is positioned below image projector 12. In one embodiment, first portion 191 of housing 19 also includes or houses media player 13 and/or control unit 15 (FIG. 1).

Image projector 12 includes a lens 22 from which an image is projected towards a screen or other viewing surface (not illustrated). As such, movement of image projector 12 may result in movement of lens 22, thereby, resulting in even greater movement of the image projected onto the viewing surface. In one embodiment, image projector 12 additionally defines a bottom surface 23 for selectively interacting with support assembly 20.

Support assembly 20 supports image projector 12 and is configured to receive image projector 12 in either a horizontal orientation, as illustrated in FIG. 3, a vertical orientation (not illustrated), or other intermediate orientation. Components of support assembly 20 may be composed of any material capable of providing structural support to the internal components of support assembly 20 as well as image projector 12 such as, plastics, metals, or composite materials. Similarly, support assembly 20 may be fabricated using any number of fabrication techniques including, but not limited to, rotational molding, blow molding, deep draw molding, injection molding, casting, forging, or stamping.

In one embodiment, support assembly 20 includes a cabinet assembly 24 and a shell or shroud 26 at least partially enclosing cabinet assembly 24. In one embodiment, as described below, cabinet assembly 24 is a speaker assembly including one or more speakers 14 (FIG. 1). In one embodiment, shroud 26 defines docking projections 27 extending upward from shroud 26 and configured to be selectively received by corresponding recesses (not illustrated) in bottom surface 23 of image projector 12. As such, image projector 12 may be supported by and selectively removed from support assembly 20. The speaker assembly, including one or more speakers 14, therefore, forms a base for image projector 12.

Figure 4:
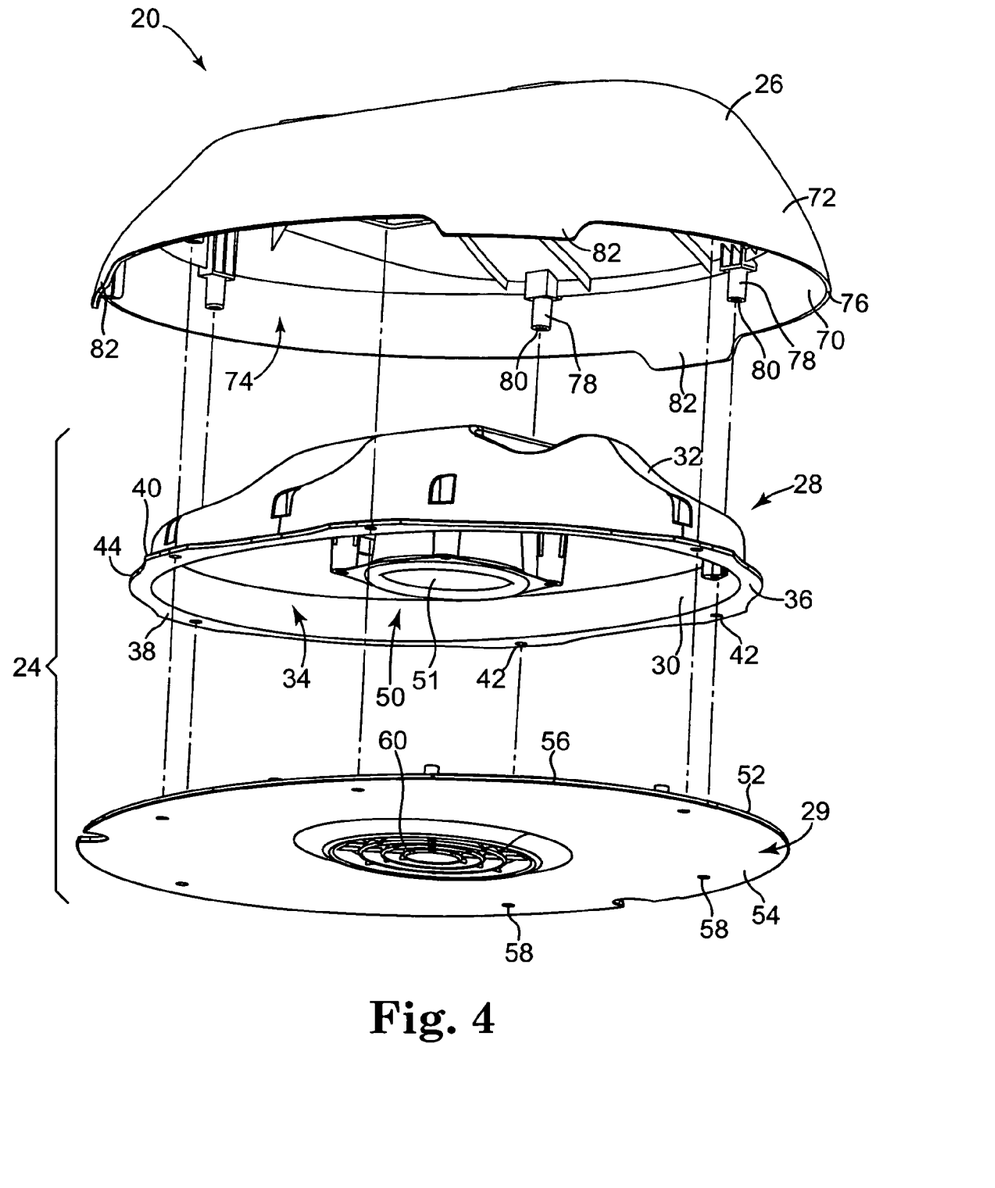
FIG. 4 is an exploded bottom perspective view illustrating one embodiment of a support assembly of the multimedia display device of FIG. 3.

FIG. 4 illustrates an exploded perspective view of one embodiment of support assembly 20 including cabinet assembly 24 and shroud 26. In one embodiment, cabinet assembly 24 includes a housing 28 and a base plate 29. Housing 28 defines an interior surface 30, an exterior surface 32 opposite interior surface 30, and an opening 34. In one embodiment, interior surface 30 is generally concave, and accordingly, exterior surface 32 is generally convex.

In one embodiment, housing 28 includes a flange 36 extending radially and outwardly from opening 34. Flange 36 defines a lower surface 38, an upper surface 40 opposite lower surface 38, a plurality of apertures 42 each extending through lower surface 38 and upper surface 40, and an outer perimeter 44. In one embodiment, each of the plurality of apertures 42 is substantially equally spaced around flange 36 near outer perimeter 44.

Cabinet assembly 24 houses a vibration-inducing device 50. In one embodiment, housing 28 of cabinet assembly 24 supports and maintains vibration-inducing device 50 and/or other internal components. Vibration-inducing device 50, such as a speaker, as described below, is configured for use with image projector 12 (one embodiment of which is illustrated in FIG. 3) and produces vibrational movement during use.

In the embodiment illustrated in FIG. 4, vibration-inducing device 50 is a speaker 51. Speaker 51 provides a user with the possibility of incorporating sound with video displays utilizing multimedia display device 10. In one embodiment, speaker 51 includes a subwoofer or low-frequency speaker. As such, speaker 51 reproduces sounds having an audio frequency, for example, of approximately 200 Hertz or less. In one embodiment, multimedia display device 10 includes speaker 51 as a subwoofer and additionally includes one or more other speakers complimentary to speaker 51 for reproducing sounds with audio frequencies, for example, above approximately 200 Hertz. While FIG. 4 illustrates one embodiment of support assembly 20 as including a single speaker 51, support assembly 20 may include and housing 28 may maintain any number of speakers 51.

Base plate 29 of cabinet assembly 24 defines an interior surface 52, an exterior surface 54 opposite interior surface 52, and an outer perimeter 56. In one embodiment, outer perimeter 56 has a substantially similar size and shape as outer perimeter 44 defined by flange 36 of housing 28. Base plate 29 additionally defines a plurality of apertures 58 spaced around base plate 29 near perimeter 56 in a manner corresponding with the spacing of the plurality of apertures 42 around flange 36. In one embodiment, base plate 29 additionally includes at least one speaker grill 60 positioned within base plate 29 to align with the position of speaker 51 within housing 28.

In one embodiment, shroud 26 is configured to substantially surround housing 28 of cabinet assembly 24. Shroud 26 defines an interior surface 70, an exterior surface 72 opposite interior surface 70, an opening 74, a perimeter 76, and a plurality of protrusions or bosses 78. In one embodiment, interior surface 70 is generally concave, and accordingly, exterior surface 72 is generally convex. Perimeter 76 is defined by an edge extending between surfaces 70 and 72 around opening 74.

Protrusions 78 are spaced about and extend from the interior surface 70 towards opening 74 with a spacing and location corresponding to the plurality of apertures 42 of housing 28. In one embodiment, each protrusion 78 is substantially hollow and, as such, defines an internal cavity 80 coaxially extending at least partially throughout each protrusion 78. In one embodiment, each protrusion 78 and each cavity 80 is cylindrically shaped. In one embodiment, each protrusion 78 and corresponding cavity 80 has a substantially vertical orientation.

In one embodiment, shroud 26 additionally defines a plurality of feet or supports 82 spaced about outer perimeter 76 and extending beyond the remaining portions of opening 74. In one embodiment, each foot 82 is configured to interact with a table or support surface (not illustrated) to support and maintain support assembly 20 and, thereby, image projector 12. More specifically, each foot 82 rests on top of the supporting surface or is used to hang the multimedia display device from a supporting surface such as a ceiling. In one embodiment, shroud 26 includes at least three feet 82 generally equally spaced about outer perimeter 58 to support multimedia display device with proper stability.

Figure 5:
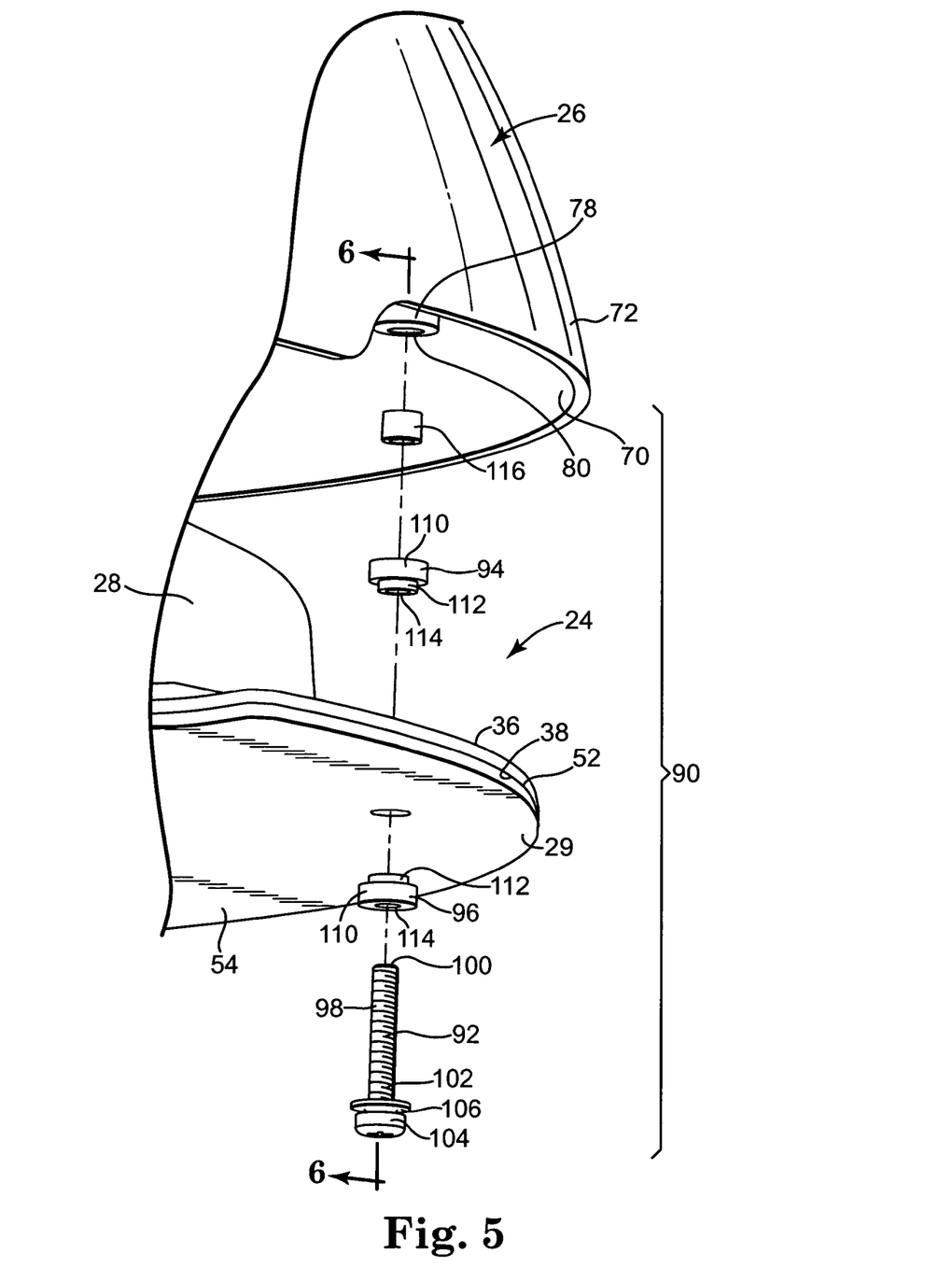
FIG. 5 is an exploded bottom perspective view illustrating a portion of the support assembly of FIG. 4 and one embodiment of a fastener assembly.
Figure 6:
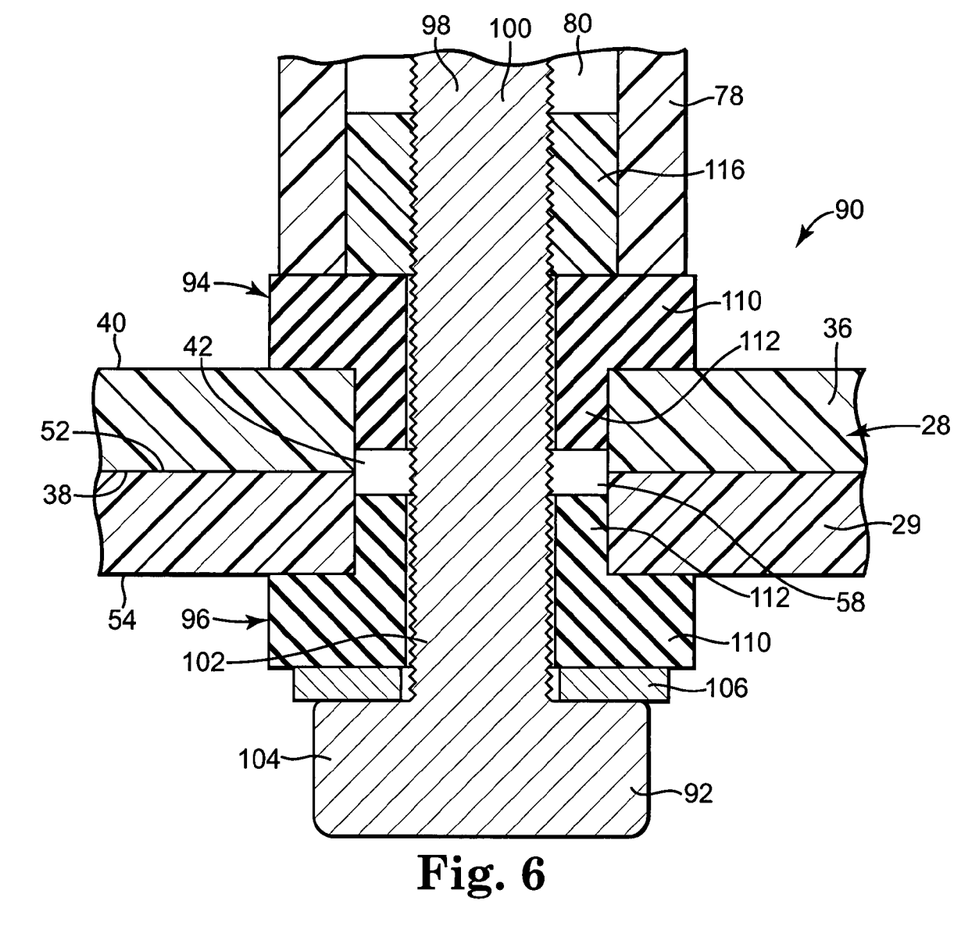
FIG. 6 is a cross-sectional view of the fastener assembly taken along line 6—6 of FIG. 5.

Upon assembly of support assembly 20, base plate 29 is aligned with housing 28. More particularly, each of the plurality of apertures 58 of base plate 29 coaxially aligns with one of the plurality of apertures 42 of housing 28. Accordingly, lower surface 38 of flange 36 interacts with interior surface 52 of base plate 29 as illustrated in the embodiment of FIGS. 5 and 6. In addition, shroud 26 is aligned with housing 28 opposite base plate 29 such that each of the cavities 80 of the plurality of protrusions 78 is coaxially aligned with one of the plurality of apertures 42 in flange 36. However, none of the plurality of protrusions 78 directly contact flange 36. In one embodiment, shroud 26, housing 28, and base plate 29 are secured to one another with a plurality of fastener assemblies 90 as described below to collectively form support assembly 20.

In one embodiment, cabinet assembly 24 is placed within, or more particularly, recessed within, shroud 26, such that shroud 26 extends around and beyond exterior surface 54 of base plate 29. In particular, each foot 82 extends beyond exterior surface 54 of base plate 29. As such, upon placement of support assembly 20 to interact with a support surface (not illustrated), feet 82 of shroud 26 directly interact with the support surface. Cabinet assembly 24, however, does not directly interact with the support surface. Rather, cabinet assembly 24 only interacts with the support surface via shroud 26.

As illustrated in the embodiment of FIGS. 5 and 6, each fastener assembly 90 includes a connector 92, a first dampening member 94, and a second dampening member 96. Connector 92 is any connection device, such as a screw, rivet, staple, etc. In one embodiment, connector 92 is a screw and includes a shaft 98 having a leading end 100 and a trailing end 102 opposite leading end 100. Each trailing end 102 is capped with a screw head 104. In one embodiment, connector 92 additionally includes a lock washer 106 positioned adjacent to screw head 104 and integrally or separately formed with the remainder of connector 92. Lock washer 106 generally prevents the application of excessive torque to connector 92, which could strip the threads or damage other material interacting with connector 92.

First dampening member 94 and second dampening member 96 are each a resilient member configured to absorb vibration introduced to cabinet assembly 24 from vibration-inducing device 50, such as speaker 51. In one embodiment, first dampening member 94 and second dampening member 96 each include a resilient grommet defining a first step 110 and a second step 112. Second step 112 is coaxially aligned with and extends from first step 110. In particular, second step 112 defines a diameter smaller than a diameter defined by first step 110. First step 110 and second step 112 collectively define an internal cavity 114 concentrically positioned with respect to and extending entirely throughout first step 110 and second step 112. In one embodiment, each dampening member 94 and 96 is formed of an elastomeric material, such as rubber, plastic, etc.

As illustrated in the embodiment of FIGS. 5 and 6, upon assembly of support assembly 20, first dampening member 94 is positioned such that second step 112 is placed within one of the plurality of apertures 42 in housing 28, and first step 110 interacts with upper surface 40 of housing flange 36. Second dampening member 96 is positioned opposite first dampening member 94 with respect to housing 28 and base plate 29. In particular, second dampening member 96 is positioned such that second step 112 is placed within one of the plurality of apertures 58 in base plate 29, and first step 110 interacts with exterior surface 54 of base plate 29. Connector 92 is inserted through the internal cavities 114 defined by dampening members 94 and 96, and thereby, extends through apertures 42 and 58. Notably, dampening members 94 and 96 prevent connector 92 from contacting housing 28 and base plate 29.

In one embodiment, lock washer 106 is positioned to interact with first step 110 of second dampening member 96 opposite second step 112. Connector 92 extends through lock washer 96 and each dampening member 94 and 96 into cavity 80 defined by one of the plurality of protrusions 78 of shroud 26. In one embodiment, a threaded insert 116 is positioned within cavity 80 and configured to selectively receive connector 92. In one embodiment, cavity 80 of protrusion 78, itself, defines a threaded interface for receiving leading end 104 of connector 92.

Figure 7:
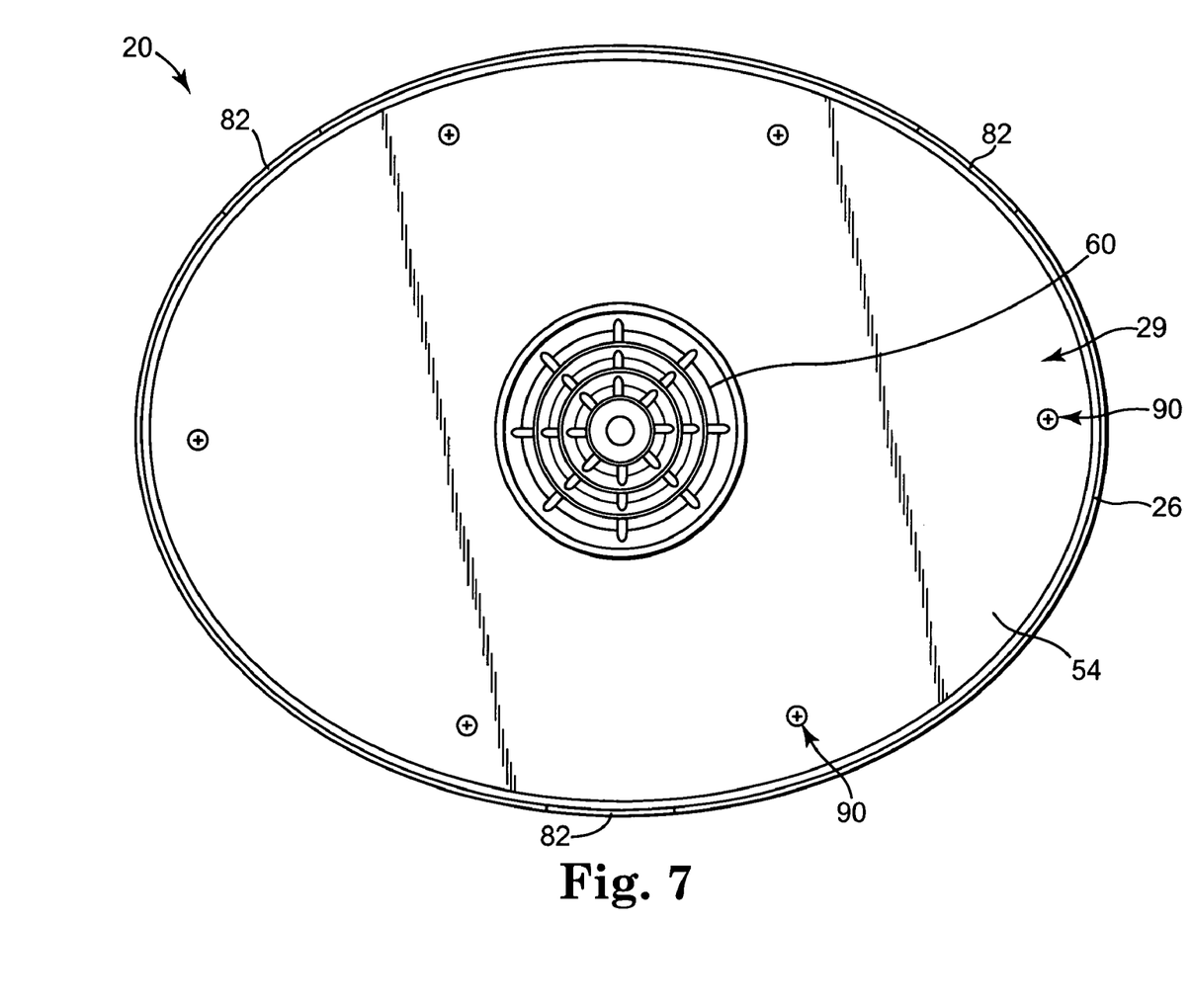
FIG. 7 is a bottom view illustrating one embodiment of the support assembly illustrated in FIG. 4.

Upon tightening of connector 92 within cavity 80, fastener assembly 90 securely maintains shroud 26, housing 28, and base plate 29 together to collectively define support assembly 20. Notably, a fastener assembly 90 is similarly positioned through each grouping of an aperture 42, an aperture 58, and a protrusion 78. In one embodiment, the plurality of fastener assemblies 90, and therefore, the plurality of apertures 42 and 58 and protrusions 78 are numbered and spaced to generally dampen or prevent vibrations introduced by or within cabinet assembly 24 from transferring to shroud 26. In one embodiment, the plurality of fasteners 90, apertures 42, apertures 58, and protrusions 78 are generally evenly spaced about perimeters 44, 56, and 76 of housing 28, base plate 29, and shroud 26, respectively. In one embodiment, as illustrated in FIG. 7, six apertures 42, six apertures 58, and six protrusions 78, and, therefore, six fastener assemblies 90, are spaced around support assembly 20 maintaining the assembly of support assembly 20.

Notably, use of dampening members 94 and 96 not only prevents connector 92 from contacting housing 28 and base plate 29, but also prevents protrusions 78 of shroud 26 from contacting housing 28 and base plate 29. In one embodiment, shroud 26 is sized and configured such that shroud 26 is only coupled with housing 28 and base plate 29 via protrusions 78. As such, in one embodiment, due to first dampening member 94, shroud 26 does not directly contact housing 28 or base plate 29 at any point. Rather, shroud 26 only interacts with housing 28 and base plate 29 of cabinet assembly 24 via first and second dampening members 94 and 96.

Upon assembly of support assembly 20, image projector 12, more particularly, the bottom surface 23 of image projector 12, is coupled with docking projections 27 of shroud 26. As such, support assembly 20 supports and maintains the position of image projector 12 with respect to a support surface (not illustrated).

Since shroud 26 only interacts with cabinet assembly 24 via first and second dampening members 94 and 96, during use, vibration introduced into or by cabinet assembly 24 is dampened as it interacts with first and second dampening members 94 and 96. First and second dampening members 94 and 96, therefore, generally prevent or at least decrease transfer of vibration from cabinet assembly 24 to shroud 26 and, more particularly, image projector 12 as supported by shroud 26. Fastener assembly 90, therefore, constitutes one embodiment of a vibration isolation assembly 23 (FIG. 2) as described above.

In one embodiment, during use, vibration-inducing device 50, such as speaker 51, vibrates or moves a distance of up to several millimeters. This vibration is dampened or absorbed by dampening members 94 and 96, thereby, lessening or eliminating movement or vibration transferred to shroud 26. In one embodiment, vibration-inducing device 50 introduces vibrations and dampening members 94 and 96 absorb vibrations of multiple directions. Although described with respect to vibrations caused by a speaker, fastener assemblies 90 including dampening members 94 and 96 can be used to isolate or dampen vibrations caused by other components within cabinet assembly 24.

As a result of fastener assemblies 90 including dampening members 94 and 96, vibration or movement of shroud 26 in response to vibration of vibration-inducing device 50 is prevented. As image projector 12 is coupled to and supported by shroud 26, preventing vibration of shroud 26 avoids vibration of image projector 12 in response to vibration of vibration-inducing device 50. By avoiding movement or vibration of image projector 12, movement or vibration of the image projected onto a viewing surface with image projector 12 is also decreased or prevented, thereby, presenting a more stable image to audiences. Presentation of a more stable image to business or consumer audiences allows more effective and less distracting presentations to be given utilizing multimedia display device 10.

In one embodiment, image projector 12 may display images using a wobulation technique including spatial and temporal shifting and displaying of image sub-frames as described, for example, in U.S. patent application Ser. No. 10/213,555, assigned to the assignee of the present invention. Thus, by providing vibration isolation assembly 23 between speaker 14 and housing 19 and, therefore, image projector 12, vibrations produced by speaker 14 are isolated from image projector 12 so as not to interfere with the wobulation technique.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intending to cover any adaptations or variations of the specific embodiments discussed herein. Therefore, it is intended that this invention be limited only by the claims and the equivalents thereof.

What is claimed is:

1. A multimedia display device, comprising:
   a housing including a first portion and a second portion, wherein the first portion is supported by the second portion and the second portion defines a shroud of the housing;
   an image projector supported within the first portion of the housing;
   a media player supported within the first portion of the housing;
   a speaker supported within and partially enclosed by the shroud of the housing; and
   a vibration isolation assembly provided between the speaker and the shroud of the housing, wherein the vibration isolation assembly prevents the shroud from directly contacting the speaker.

2. The multimedia display device of claim 1, wherein the first portion of the housing and the second portion of the housing are separable.

3. The multimedia display device of claim 1, wherein the second portion of the housing forms a base of the multimedia display device.

4. The multimedia display device of claim 1, wherein the vibration isolation assembly includes at least one dampening member interposed between the speaker and the shroud of the housing.

5. The multimedia display device of claim 1, wherein the vibration isolation assembly includes a connector secured to the shroud of the housing, a first dampening member interposed between the shroud of the housing and the speaker, and a second dampening member interposed between the speaker and the connector.

6. The multimedia display device of claim 1, wherein the speaker includes a sub-woofer.

7. The multimedia display device of claim 6, wherein the sub-woofer is adapted to reproduce sounds having an audio frequency of less than approximately 200 Hertz.

8. A multimedia display device, comprising:
   a housing;
   an image projector maintained within the housing;
   a media player maintained within the housing;
   a speaker assembly including a speaker;
   a shell at least partially enclosing the speaker assembly, the shell being coupled to and supporting the housing; and
   at least one fastener assembly coupling the speaker assembly to the shell, the at least one fastener assembly including at least one dampening member interposed between the speaker assembly and the shell,
   wherein the speaker assembly and the shell are only coupled with one another via the at least one fastener assembly.

9. The multimedia display device of claim 8, wherein the at least one fastener assembly includes a connector extending through the speaker assembly and into the shell, wherein the at least one dampening member isolates the connector from the speaker assembly.

10. A multimedia display device, comprising:
    a housing;
    an image projector maintained within the housing;
    a media player maintained within the housing;
    a speaker assembly including a speaker;
    a shell at least partially enclosing the speaker assembly, the shell being coupled to and supporting the housing; and
    at least one fastener assembly coupling the speaker assembly to the shell, the at least one fastener assembly including at least one dampening member interposed between the speaker assembly and the shell,
    wherein the at least one fastener assembly includes a plurality of fastener assemblies spaced around a perimeter of the shell and the speaker assembly.

11. A multimedia display device, comprising:
    a housing;
    an image projector maintained within the housing;
    a media player maintained within the housing;
    a speaker assembly including a speaker;
    a shell at least partially enclosing the speaker assembly, the shell being coupled to and supporting the housing; and
    at least one fastener assembly coupling the speaker assembly to the shell, the at least one fastener assembly including at least one dampening member interposed between the speaker assembly and the shell,
    wherein the at least one dampening member prevents the shell from directly contacting the speaker assembly.

12. The multimedia display device of claim 11, wherein the speaker assembly is recessed within the shell.

13. A multimedia display device, comprising:
    a housing;
    an image projector maintained within the housing;
    a media player maintained within the housing;
    a speaker assembly including a speaker;
    a shell at least partially enclosing the speaker assembly, the shell being coupled to and supporting the housing; and
    at least one fastener assembly coupling the speaker assembly to the shell, the at least one fastener assembly including at least one dampening member interposed between the speaker assembly and the shell,
    wherein the at least one dampening member includes a first dampening member positioned adjacent to the speaker assembly and a second dampening member positioned adjacent to the speaker assembly opposite the first dampening member.

14. The multimedia display device of claim 13, wherein the first dampening member is interposed between the speaker assembly and the shell.

15. A method of supporting a vibration-inducing device in a multimedia display device including an image projector, the method comprising:
provided a cabinet assembly including the vibration-inducing device;
coupling a shroud to the cabinet assembly with a plurality of fastener assemblies each including at least one dampening member, including at least partially enclosing the cabinet assembly with the shroud and interposing the at least one dampening member between the cabinet assembly and the shroud; and
coupling the image projector to the shroud.

16. The method of claim 15, wherein each of the fastener assembles includes a connector, wherein coupling the shroud to the cabinet assembly includes extending the connector through the cabinet assembly and into the shroud.

17. The method of claim 16, wherein the at least one dampening member includes a first dampening member and a second dampening member, wherein coupling the shroud to the cabinet assembly includes interposing the first damping member between the connector and the cabinet assembly.

18. The method of claim 17, wherein coupling the shroud to the cabinet assembly includes interposing the first dampening member between the shroud and the cabinet assembly.

19. The method of claim 18, wherein coupling the shroud to the cabinet assembly includes interposing the second dampening member between the connector and the cabinet assembly.

20. The method of claim 15, further comprising:
recessing the cabinet assembly within the shroud.

21. The method of claim 15, wherein the vibration-inducing device includes a speaker.

* * * * *